Jan. 3, 1961 K. H. BECK 2,967,279

PHOTOTRANSISTOR MODULATING APPARATUS

Filed May 21, 1956 3 Sheets-Sheet 1

INVENTOR.
KENNETH H. BECK
BY Arthur H. Swenson
ATTORNEY.

Jan. 3, 1961 K. H. BECK 2,967,279

PHOTOTRANSISTOR MODULATING APPARATUS

Filed May 21, 1956 3 Sheets-Sheet 2

*INVENTOR.*
KENNETH H. BECK

*BY* Arthur H. Swenson

ATTORNEY.

Jan. 3, 1961 K. H. BECK 2,967,279

PHOTOTRANSISTOR MODULATING APPARATUS

Filed May 21, 1956 3 Sheets-Sheet 3

*INVENTOR.*
KENNETH H. BECK

*BY* Arthur H. Swanson
ATTORNEY.

United States Patent Office 2,967,279

Patented Jan. 3, 1961

2,967,279

PHOTOTRANSISTOR MODULATING APPARATUS

Kenneth H. Beck, Newtown, Pa., assignor to Minneapolis-Honeywell Regulator Company, Minneapolis, Minn., a corporation of Delaware Filed May 21, 1956, Ser. No. 585,997

26 Claims. (Cl. 332—3)

A general object of the present invention is to provide a new and improved modulating circuit. More specifically, the present invention is concerned with a circuit for modulating a carrier frequency signal in accordance with light level variations.

In the apparatus described hereinafter, the present invention is utilized in a facsimile scanning system. In such a system, light is reflected from the copy being scanned onto the photosensitive element in the modulating circuit. The amplitude of the reflected light varies with the changing reflectance of the copy.

Some prior art methods of modulating a carrier frequency signal in accordance with light level variations apply the carrier directly to the filament of an incandescent lamp employed as the light source. Since the total modulation of such a light source cannot be accomplished, the unmodulated light component will produce a component in the output of the photodetector at the information frequency in addition to the component at the carrier frequency. The problem of separating these two components is relatively simple if there is a reasonable frequency difference between the carrier and the highest information signal frequency. Because of the rapidly decreasing modulation efficiency of incandescent lamps with frequency, however, the frequency of the carrier must be kept relatively low, increasing the problem of separating the carrier and information signals.

Accordingly, another specific object of the present invention is to provide a new and improved circuit for modulating a carrier frequency signal in accordance with light level variations employing an unmodulated light source.

Generally, all photosensitive elements are also sensitive to thermal stimuli. While the use of an unmodulated light source solves some problems, it introduces the problem of distinguishing between the light stimulated and the heat stimulated output of the photosensitive elements. Some prior art devices employ compensating circuits. The use of such circuits, however, always implies a matching or selection process with generally some compromise in performance. Other prior art devices employ mechanical means to periodically interrupt the light falling on the photosensitive element. Mechanical light "choppers," however, involve the use of moving parts and are generally larger and heavier than other elements of the photo-optic system.

It is therefore, still another specific object of the present invention to provide a new and improved photomodulating circuit having an output which is substantially independent of temperature without the use of compensating circuits or mechanical light "choppers."

It is a further object of the present invention to utilize the unique properties of phototransistors to provide a new and improved photomodulating circuit having an output which is substantially independent of temperature.

Another further object of the present invention is to provide switching means for periodically open circuiting and short circuiting two of the phototransistor electrodes to render it periodically insensitive to light without effecting its sensitivity to heat.

In the switched phototransistor modulating circuit of the present invention, the amplitude of the D.C. component of the light-induced current pulses varies with changes in intensity of the incident light. Such variations produce transients in the output circuit if RC coupling is employed. This produces an undesirable component of the information frequency in the output signal. It is therefore a still further object of the present invention to provide means for eliminating this transient or information frequency component from the output signal.

While the switched phototransistor modulating circuit of the present invention provides a novel and effective means for eliminating substantially all of the thermally produced component of the phototransistor output, it is a still further object of the present invention to provide means for achieving an even greater degree of compensation for use in critical applications.

The various features of novelty which characterize this invention are pointed out with particularity in the claims annexed to and forming a part of this specification. For a better understanding of this invention, its advantages, and the specific object obtained with its use, reference should be had to the accompanying drawings and descriptive matter in which preferred embodiments of this invention are illustrated and described.

Figure 1:
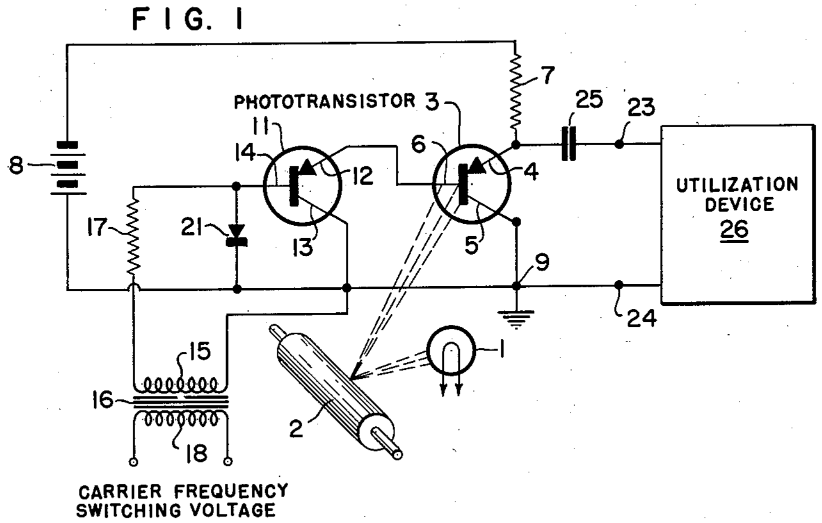
Fig. 1 is a circuit diagram of a preferred embodiment of the present invention.

Referring now to Fig. 1, the numeral 1 represents a light source in a facsimile scanning system. The light source 1 is positioned so as to reflect light from copy on a drum 2 onto the photosensitive area of a phototransistor 3. The phototransistor 3 is a type R66 pnp phototransistor manufactured by the Radio Receptor Company, Inc. The light sensitive area of this transistor as used is principally the collector-base junction. Illumination of the emitter-base junction also produces an output current.

The phototransistor 3 has an emitter 4, a collector 5, and a base 6. The emitter 4 of the phototransistor 3 is connected by means of a load resistor 7 to the negative terminal of a source of transistor energizing current, shown here as a battery 8. The collector 5 of the phototransistor 3 is connected to the positive terminal of the battery 8. As shown, the collector 5 and also the positive terminal of the battery 8 are connected to ground at a point 9. Switching means, comprising a transistor 11 operated as a synchronous switch, are connected between the base 6 and the collector 9 of the transistor 3. The transistor 11 is a pnp junction transistor having the usual emitter, collector, and base electrodes. As shown, the emitter 12 of the transistor 11 is connected to the base 6 of the phototransistor 3 and the collector 13 of the transistor 11 is connected to the collector 5 of the phototransistor 3. The base 14 and the emitter 13 of the transistor 11 are connected across a suitable source of switching voltage, the secondary winding 15 of the transformer 16, by means of a current limiting resistor 17. The transformer 16 has a primary winding 18 connected to a suitable source of switching voltage of the desired carrier frequency. A diode 21 is connected in the forward direction between the base and collector of the switching transistor to reduce spikes appearing in the output. In applications where the spikes are not objectionable, the diode 21 may be eliminated. The output of this circuit is taken across a pair of output terminals 23 and 24. As shown, the output terminal 23 is connected to the emitter 4 of the phototransistor 3 by means of a capacitor 25.

The output of the circuit of Fig. 1 is shown connected to a suitable signal utilization device 26. In facsimile scanning systems, the output of the modulating circuit is generally amplified and transmitted via radio or wire transmission lines to a facsimile receiving apparatus. A typical receiver for such transmitted signals could be a Model RF Photofacsimile Recorder manufactured by the Times Facsimile Corporation. This receiver utilizes an 1800 c.p.s. carrier frequency. When radio is employed as the means of transmission, the output of the modulator circuit is generally converted from an amplitude modulated signal to a frequency modulated signal for transmission.

Figure 2:
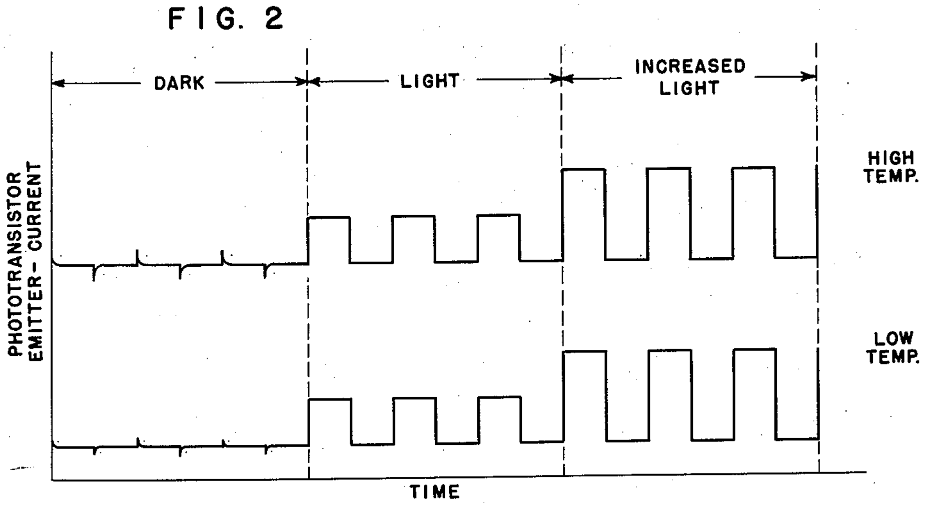
Fig. 2 is a graph showing the wave forms of the output of the circuit of Fig. 1 for various conditions of light and temperature.

In considering the operation of the circuit of Fig. 1, it should be noted that when the base-collector circuit of the phototransistor is short circuited the sensitity of the emitter current to light falling on the collector-base junction is reduced to a negligibly small amount while the effects of temperature on the emitter current is virtually unchanged. When the base-collector circuit of the phototransistor is open the emitter current is a function of both temperature and the intensity of the incident light. In Fig. 1, the switching transistor 11 short circuits and open circuits the base-collector path of the phototransistor 3 on alternate half cycles of the voltage applied to the base-collector circuit of the switching transistor 11. The phototransistor emitter current is then switched between a value determined almost entirely by the thermally produced leakage current and one determined by the leakage curent plus the light induced current. The resulting wave forms at the emitter are shown in Fig. 2. The output coupling capacitor 25 removes the D.C. level due to the thermally produced leakage current so that the output wave form is a square wave at the switching frequency having an amplitude determined by the intensity of the light incident on the phototransistor 3. If the switching frequency is set at the desired carrier frequency, the output of the circuit of Fig. 1 will be a square wave at the carrier frequency modulated in accordance with light level variations.

It should be noted, that in the circuit of Fig. 1 both the switching transistor 11 and the phototransistor 3 are operated in the "inverted" connection, that is, the emitters and collectors are interchanged. This is done to take advantage of the lower leakage current and better switching action obtainable from this connection. It also should be noted that a small degree of added temperature compensation, as will be explained in more detail hereinafter, is achieved from the fact that the temperature sensitive reverse current of the switching transistor 11 flows in the base circuit of the phototransistor 3 in such a direction that increases in that current, due to increasing temperature, oppose the tendency of the emitter current of the phototransistor 3 to increase with temperature. In applications where extreme independence from temperature is required, a matching of the temperature characteristics of the switching transistor 11 and the phototransistor 3 might be called for.

Figure 3:
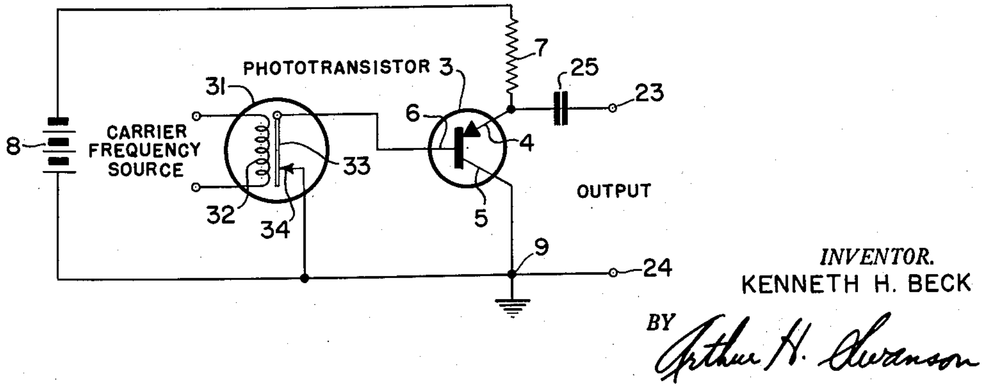
Fig. 3 is a circuit diagram of a modification of the embodiment of the present invention shown in Fig. 1.

Referring now to Fig. 3, there is shown a modification of the embodiment of the present invention shown in Fig. 1 in which mechanical switching means are employed to open circuit and short circuit the base-collector circuit of the phototransistor 3. For simplicity, the light source has not been shown and similar reference characters have been employed to designate components corresponding to those employed in the circuit of Fig. 1. The mechanical switching means employed in Fig. 3 is a vibrating switch 31. The switch 31 includes a winding 32 energized by alternating current of the desired carrier frequency to cause a polarized vibrating reed 33 to vibrate at that frequency. As the reed 33 vibrates back and forth, under the influence of the winding 32, it alternately engages contact 34. As shown, the contact 34 is connected to the collector 5 of the phototransistor 3 and the vibrating reed 33 is connected to the base 6 of the transistor 3. Accordingly, as the vibrating reed 33 alternately engages and disengages the contact 34, the base-collector circuit of the phototransistor 3 is alternately open circuited and short circuited. The operation of the circuit of Fig. 3 is identical to the operation of the circuit of Fig. 1 with the exception that the vibrating switch 31 has been substituted for the switching transistor 11.

In the circuits of Figs. 1 and 3 the D.C. component of the light produced current pulses varies with the intensity of the light. In some applications, particularly facsimile scanning, where rapid changes in light intensity are encountered, this varying D.C. component produces transients in the output of the circuit due to the RC coupling employed. This gives rise to a component in the output signal at the information frequency of the scanned copy in addition to the modulated carrier frequency signal. If the carrier switching frequency employed is much higher than the highest light variation frequency, reduction of the transient produced by the RC coupling network can be accomplished without a significant loss of the carrier frequency signal. If, however, as in the case of facsimile scanning, the required carrier frequency is not many times higher than the highest light variation frequency, more efficient reduction of the signal due to light variation may be accomplished by means of the circuit shown in Fig. 4.

Figure 4:
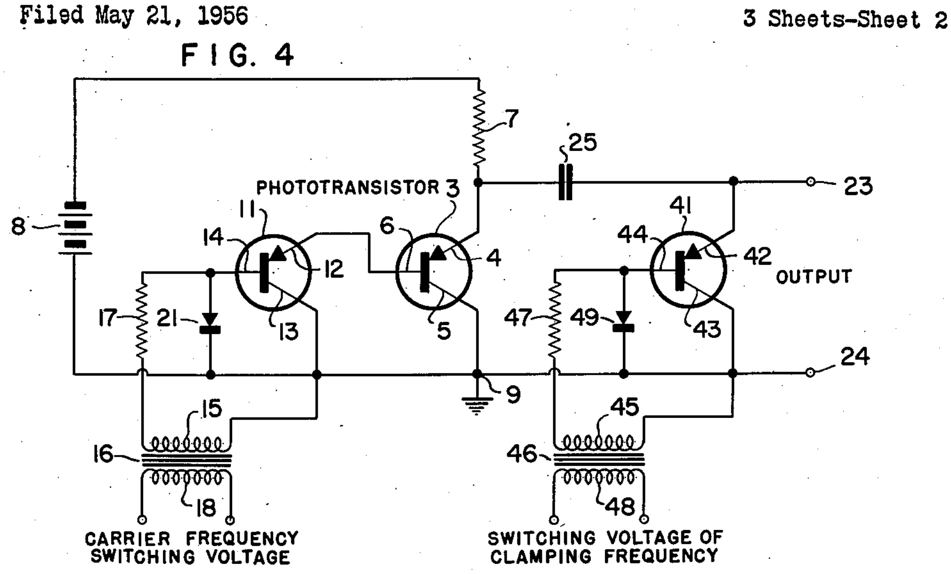
Fig. 4 is a circuit diagram of another embodiment of the present invention which includes means for eliminating transient components in the output produced by variations in the intensity of the reflected light.

Referring now to Fig. 4, it should be noted that again the light source has not been shown and similar reference characters have been employed to designate components corresponding to those employed in the circuit of Fig. 1. In this circuit, a transistor 41, operated as a switch, is connected across the output terminals 23 and 24 to clamp the output signal to zero periodically during the carrier cycle. The transistor 41 is a p-n-p junction transistor having the usual emitter, collector, and base electrodes. The emitter 42 of the transitsor 41 is connected between the capacitor 25 and the output terminal 23. The collector 43 of the transistor 41 is connected to the output terminal 24. The base 44 and the collector 43 of the transistor 41 are connected to a source of switching voltage, the secondary winding 45 of the transformer 46, by means of a current limiting resistor 47. The transformer 46 has a primary winding 48 connected to a source of switching voltage having a frequency considerably higher than the carrier frequency. As shown, a diode 49 is connected in the reverse direction between the base and collector of the transistor 41. This diode tends to reduce spikes produced in the output of this circuit.

Figure 5:
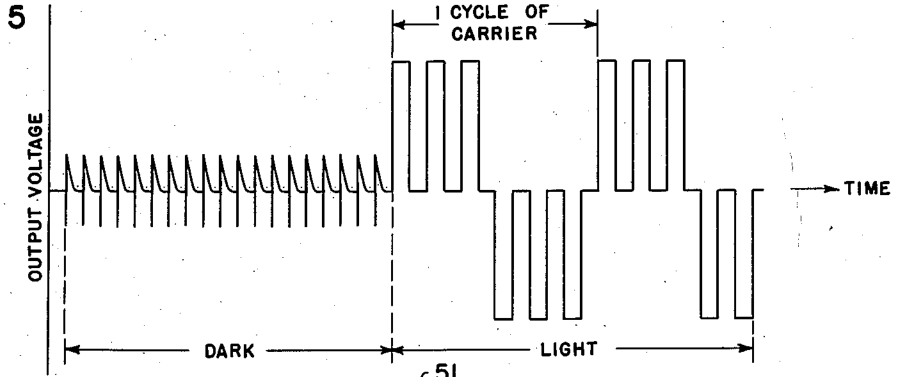
Fig. 5 is a graph showing the wave forms of the output of the circuit of Fig. 4 for various conditions of light.

The clamping circuit periodically shorts the output of the switched phototransistor modulator circuit to ground during both the positive and negative half cycles of the carrier, thus preventing transient accumulation of charge on the coupling capacitor 25. The resulting output wave forms are shown in the Fig. 5. The transient which normally would result from a step function change in light intensity is almost completely absent. The high frequency clamping pulses may be subsequently removed by filtering. If there is a suitable frequency separation between the carrier frequency and the clamping frequency signals, such filtering creates no problem.

Figure 6:
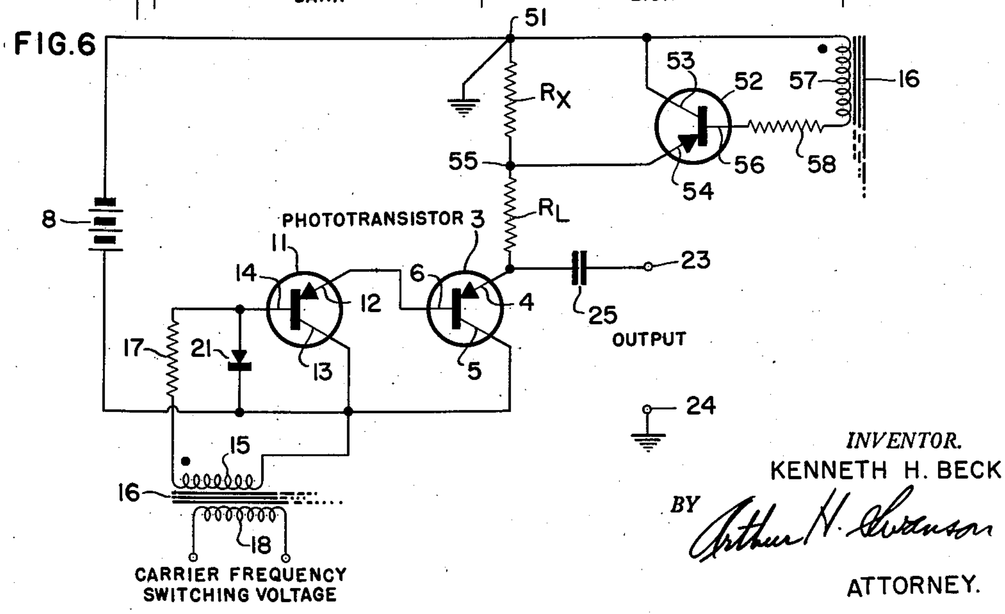
Fig. 6 is a circuit diagram of another embodiment of the present invention which includes means for achieving an output having an even greater independence from the effects of temperature.
Figure 7:
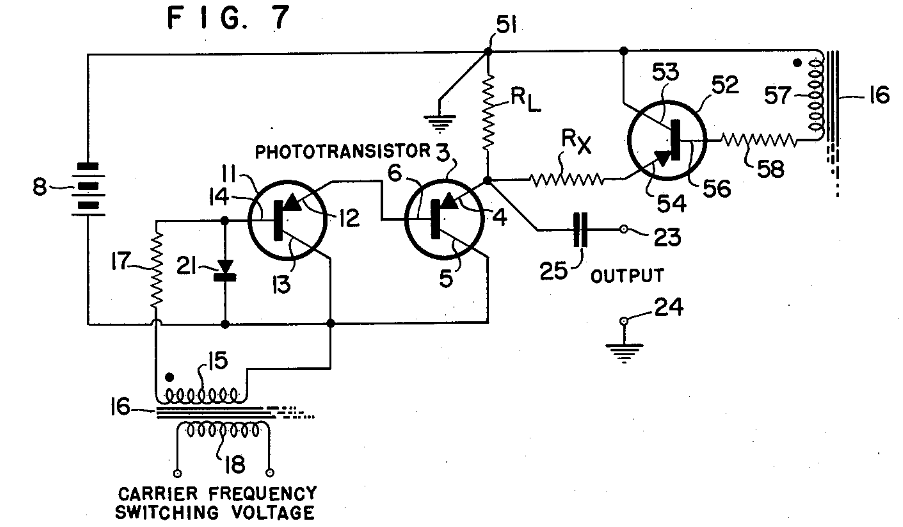
Fig. 7 is a circuit diagram of a modification of the embodiment of the present invention shown in Fig. 6.

The switched phototransistor modulator circuit shown in Fig. 1 has a high degree of inherent compensation for the dark current or thermally stimulated output of the phototransistor 3. For critical applications, however, the circuits shown in Figs. 6 and 7 provide means for achieving an even greater degree of compensation. Referring for a moment to Fig. 1, the phototransistor 3 is light responsive essentially only when the switching transistor 11 is in the "open" or "off" condition. In the absence of light, the emitter current of the phototransistor 3 with the base open can be given as:

$$I_{e_1}=\frac{I_{e0}}{1-\alpha_i} \qquad (1)$$

where:

$I_{e_0}$=emitter-base junction saturation current
$\alpha_i$=inverse D.C. current gain (collector and emitter functions interchanged).

When the base of the phototransistor 3 is connected to its collector, that is, when the switching transistor 11 is in the "on" or "closed" state, the emitter current may be expressed very closely by:

$$I_{e_2}=\frac{I_{e0}}{1-\alpha_i\alpha_n} \qquad (2)$$

where: $\alpha_n$=normal transistor D.C. current gain.

In the absence of light, the phototransistor emitter dark current flowing through the load resistor 7, which for the purpose of this explanation shall be called $R_L$, produces a voltage across $R_L$ which alternately takes the values $I_{e_1}R_L$ and $I_{e_2}R_L$ as the switching transistor 11 opens and closes at the carrier frequency. The difference between these two levels results in a square wave output signal of amplitude $(I_{e_1}-I_{e_2})R_L$ at the carrier frequency. This is the minimum carrier output obtainable in the absence of light without some additional compensating means. This level is quite small at moderate temperatures since the difference between $I_{e_1}$ and $I_{e_2}$ is due only to the $\alpha_n$ term in Equation 2. $\alpha_n$ will ordinarily be quite close to unity. Typical values for $\alpha_n$ are from .97 to .99. However, since Equation 2 involves the reciprocal of the very small quantity $(1-\alpha_i\alpha_n)$ a very small difference between $\alpha_n$ and unity may render $I_{e_2}$ smaller than $I_{e_1}$ by an amount not negligible for critical applications, especially at elevated temperatures where high values of $I_{e_0}$ occur.

The above treatment has ignored the leakage current of the switching transistor 11 when it is in the open condition. If some other kind of switching device is used to accomplish the switching function, such as the A.C. converter shown in Fig. 3, or if a very low leakage type of transistor were employed, the "switch open" leakage current might be truly negligible. The effect of this current when it is not negligible is to subtract from $I_{e_1}$ since the leakage current of the switching transistor 11 flows into the base of the phototransistor 3 and produces an amplified component of $I_e$ flowing into the emitter of the phototransistor 3 in opposition to the direction of $I_{e_1}$. As explained before, this current flow tends to produce a small degree of temperature compensation. If the component of the phototransistor emitter current due to the leakage current of the switching transistor 11 is represented by $I_{e'_1}$, then the "zero light" carrier output is seen to be a square wave of amplitude $(I_{e_1}-I_{e'_1}-I_{e_2})R_L$. As long as $I_{e'_1}$ is smaller than $(I_{e_1}-I_{e_2})$ it will act to reduce the amplitude of the carrier output. However, if $I_{e'_1}$ exceeds $(I_{e_1}-I_{e_2})$ the zero light carrier output will be of the opposite phase and will increase with increases in $I_{e'_1}$. The use of $I_{e'_1}$ to compensate for differences in the dark current levels of the phototransistor 3 implies selection of transistors with particular thermal leakage current characteristics. In some applications this may be regarded as undesirable. It is better, therefore, to utilize a very low leakage device for the switching transistor 11 and to obtain compensation by some other means.

Referring now to Fig. 6, there is shown a circuit which may be employed to compensate for the difference between $I_{e_1}$ and $I_{e_2}$, neglecting the effects of $I_{e'_1}$. Again for simplicity, the light source has not been shown and similar reference characters have been employed to designate components similar to those employed in the circuit of Fig. 1. It should be noted, that the collector 5 of the phototransistor 3 is no longer grounded. Instead, the negative terminal of the battery 8 is grounded at the point 51. In addition, the load resistor 7 of Fig. 1 has been replaced by two load resistors $R_x$ and $R_L$ connected in series between the point 51 and the emitter 4 of the phototransistor 3. A switching transistor 52 is employed to shunt the load resistor $R_x$. The switching transistor 52 is a p-n-p junction transistor having the usual emitter, collector, and base electrodes. The collector 53 of the transistor 52 is connected to the point 51 and the emitter 54 of the transistor 52 is connected to the junction 55 of the load resistors $R_x$ and $R_L$. A suitable source of carrier frequency switching voltage is connected between the base 56 and the collector 53 of the transistor 52. As shown, the carrier frequency switching voltage for the transistor 52 is derived from a secondary winding 57 which may conveniently be an additional secondary winding on the transformer 16. A current limiting resistor 58 is connected in series with the switching voltage. The phasing of the secondary windings 15 and 57 of the transformer 16 is indicated by means of the polarity marks shown.

The current if Fig. 6 provides the desired compensation by providing different values of load resistance through which $I_{e_1}$ and $I_{e_2}$ may flow. The switching transistor 52 alternately shorts and opens at the carrier frequency so that the load resistance for the phototransistor 3 alternately takes the values $R_L$ and $(R_L+R_x)$. The phasing of the switching transistor 52 with respect to the switching transistor 11 is such that $I_{e_1}$ flows through $R_L$ and $I_{e_2}$ flows through $(R_L+R_x)$. The zero light output square wave then has the amplitude:

$$e_0=I_{e_1}R_L-I_{e_2}(R_L+R_x) \qquad (3)$$

The value of $R_x$ to obtain perfect compensation may be found by setting $e_0=0$ and solving for $R_x$ which yields:

$$R_x=\alpha_i R_L\frac{1-\alpha_n}{1-\alpha_i} \qquad (4)$$

The above solution neglects the "open" leakage current of the switching transistor 52 which will flow in $R_x$ in the same direction as $I_{e_2}$. Since this current is not amplified and flows through a small resistance it is more legitimately neglected than the leakage of the switching transistor 11. If $\alpha_i$ and $\alpha_n$ vary with temperature such that the quantity $\alpha_i(1-\alpha_n)/(1-\alpha_i)$ is not a constant, then the compensation will not be perfect.

$R_x$ and the switching transistor 52 may be connected in other ways to obtain compensation for $(I_{e_1}-I_{e_2})$ not equal to zero. One of these ways is shown in Fig. 7. Similar reference characters have been employed to designate components similar to those employed in the embodiment of the present invention shown in Fig. 6. As shown, the resistor $R_x$ is connected in series with the emitter-collector circuit of the transistor 52 across the load resistor $R_L$. In this circuit, the phasing of the switching transistor 52 with respect to the switching transistor 11 is such that $R_x$ is shunted across $R_L$ when $I_{e_1}$ is flowing. Thus, the output voltage for zero light is:

$$e_0=I_{e_1}\frac{R_L R_x}{R_L+R_x}-I_{e_2}R_L \tag{5}$$

For perfect compensation, the value of $R_x$ may be found by setting $e_0=0$ which yields:

$$R_x=\frac{R_L}{\alpha_i}\left(\frac{1-\alpha_i}{1-\alpha_n}\right) \tag{6}$$

Again, if $\alpha_i$ and $\alpha_n$ vary with temperature such that the quantity $(1/\alpha_i)(1-\alpha_i)/(1-\alpha_n)$ is not a constant, the compensation will not be perfect. This quantity varies more rapidly with changes in $\alpha_n$ than does its reciprocal which applies to Equation 4.

Compensation circuits such as those shown in Figs. 6 and 7 make it practical to connect the phototransistor in the normal manner, that is, with the collector biased as a collector. As explained before, when the phototransistor is connected in the inverse manner, that is, with the emitter biased as a collector, the difference between the leakage current with the base-collector circuit open circuited and the leakage current with the base-collector circuit short circuited is negligible. The small difference being due to the $\alpha_n$ term in Equation 2 which ordinarily is quite close to unity. According, for most applications no compensation is necessary. With currently available phototransistors, however, satisfactory operation cannot be obtained from the switched phototransistor modulating circuit of the present invention without additional compensation when the phototransistor is connected in the normal manner. The reason for this can be seen from the following equations. In the absence of light, the collector current of the phototransistor with the base open circuited is given as:

$$I_{c_1}\cong\frac{I_{c0}}{1-\alpha_n} \tag{7}$$

where: $I_{c0}$=collector-base junction saturation current.

When the base of the phototransistor is connected to its emitter, that is, when the switching transistor is in the "on" or "closed state," the collector current may be expressed as:

$$I_{c_2}\cong\frac{I_{c0}}{1-\alpha_i\alpha_n} \tag{8}$$

The difference between these two currents is due to the $\alpha_i$ term in Equation 8 which is generally not very close to unity. Accordingly, the difference between these currents may be considerable. It should be noted, however, that for phototransistors having $\alpha_i\cong1$ it is within the scope of the present invention to operate the phototransistor in the normal manner in the circuits of the present invention.

Figure 8:
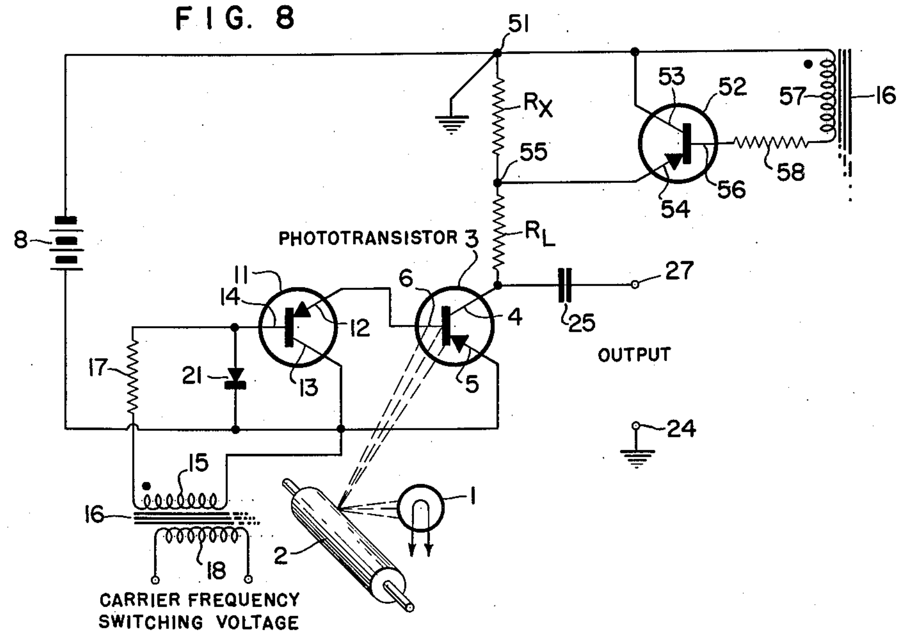
Fig. 8 is a circuit diagram of a modification of the embodiment of the present invention shown in Fig. 6 but with the phototransistor operated in the "normal" rather than the "inverted" connection.

Referring now to Fig. 8, there is shown a circuit which may be employed to compensate for the difference between $I_{c_1}$ and $I_{c_2}$, neglecting the effects of the leakage current of the switching transistor, when the phototransistor is connected in the normal manner. For simplicity, similar reference characters have been employed to designate components similar to those employed in Figs. 1 and 6. The circuit of Fig. 8 differs from the circuit of Fig. 6 in two respects. First, the load is connected in the phototransistor collector circuit. Secondly, the base-emitter junction of the phototransistor is illuminated by the light reflected from scanned copy.

The circuit of Fig. 8 provides the desired compensation by providing different values of load resistance through which $I_{c_1}$ and $I_{c_2}$ may flow. The switching transistor 52 alternately shorts and opens at the carrier frequency so that the load resistance for the phototransistor 3 alternately takes the value of $R_L$ and $(R_L+R_x)$. The phasing of the switching transistor 52 with respect to the switching transistor 11 is such that $I_{c_1}$ flows through $R_L$ and $I_{c_2}$ flows through $(R_L+R_x)$. Thus, the output voltage for zero light and the phototransistor base open circuited is:

$$e_{0_1}=\frac{I_{co}}{1-\alpha_n}R_L \tag{9}$$

and the output voltage for zero light, the phototransistor base shorted to the emitter is:

$$e_{0_2}=\frac{I_{c0}}{1-\alpha_i\alpha_n}(R_L+R_x) \tag{10}$$

For perfect compensation, the value of $R_x$ may be found by equating $E_{01}=E_{02}$ and solving for $R_x$ which yields:

$$R_x=R_L\alpha_n\frac{1-\alpha_i}{1-\alpha_n} \tag{11}$$

It should be again noted that if $\alpha_n$ and $\alpha_i$ vary with temperature the compensation will not be perfect.

While, in accordance with the provisions of the statutes, there has been illustrated and described the best forms of the embodiments of the present invention now known, it will be apparent to those skilled in the art that changes may be made in the forms of the apparatus disclosed without departing from the spirit of the invention as set forth in the appended claims and that in some instances certain features of the invention may be used to advantage without corresponding use of other features.

Having described this invention, that which is claimed as new and which it is desired to secure by Letters Patent is:

1. In combination, a phototransistor having an emitter electrode, a collector electrode, and a base electrode, a load and a source of energizing current connected in series between said emitter electrode and said collector electrode, and switching means actuated at a carrier frequency and connected between said base electrode and one of the other phototransistor electrodes to effectively alternately open circuit and short circuit the last named two electrodes at said carrier frequency.

2. In combination, a phototransistor having an emitter electrode, a collector electrode, and a base electrode, a load and a source of energizing current connected in series between said emitter electrode and said collector electrode, switching means actuated at a carrier frequency and connected between said base and one of the other phototransistor electrodes to effectively alternately open circuit and short circuit the last named two electrodes at said carrier frequency, and means for illuminating the junction of said last named two electrodes.

3. Apparatus as specified in claim 2 wherein said switching means is connected between said base electrode and said collector electrode.

4. An apparatus for modulating a carrier frequency signal in accordance with light level variations comprising in combination a phototransistor having an emitter electrode, a collector electrode, and a base electrode, means for illuminating the photosensitive area of said transistor with said light level variations, a source of energizing current, a load, means connecting said source and said load in series between the emitter electrode and the collector electrode of said phototransistor, and switching means connected between the base electrode and one of the other electrodes of said phototransistor for alternately open circuiting and short circuiting said electrodes at said carrier frequency.

5. Apparatus as specified in claim 4 wherein said switching means is connected between the base electrode and said collector electrode.

6. Apparatus as specified in claim 4 wherein said switching means comprises a transistor having its emitter-collector circuit connected between the base and collector of said phototransistor and having its collector-base circuit connected to a source of carrier frequency switching voltage.

7. Apparatus as specified in claim 4 wherein said switching means comprises a synchronous switch driven at said carrier frequency.

8. A circuit for varying the amplitude of a carrier frequency signal in accordance with the intensity of light incident upon the photosensitive area of a phototransistor comprising in combination a phototransistor having an emitter, a collector, and a base, a load and a source of transistor energizing current connected in series between the emitter and the collector of said phototransistor, a transistor, having an emitter, a collector, and a base, said transistor being operated as a synchronous switch at said carrier frequency with its emitter-collector circuit connected between the collector and base of said phototransistor, the collector and base of said transistor being adapted to be connected to a source of carrier frequency switching voltage to cause said transistor to effectively alternately open circuit and short circuit said phototransistor collector and base at said carrier frequency, and means for coupling the alternating component of the current through said load to a utilization device.

9. A circuit for varying the amplitude of a carrier frequency signal in accordance with the intensity of light incident upon the photosensitive area of a phototransistor comprising in combination a phototransistor positioned to receive said light, said phototransistor having an emitter, a collector, and a base, a load and a source of transistor energizing current connected in series between the emitted and the collector of said phototransistor, a transistor having an emitter, a collector, and a base, the emitter of said transistor being connected to the base of said phototransistor, the collector of said transistor being connected to the collector of said phototransistor, the collector base circuit of said transistor being adapted to be connected to a source of carrier frequency switching voltage to cause said transistor to effectively alternately open circuit and short circuit said phototransistor collector and base at said carrier frequency, and means connected to the emitter circuit of said phototransistor for coupling the alternating component of current through said load to an output circuit.

10. Apparatus as specified in claim 9 wherein said transistor and said phototransistor are of the same conductivity type and have substantially matched temperature sensitive leakage current characteristics.

11. A circuit for modulating a carrier frequency signal in accordance with light level variations comprising in combination a phototransistor adapted to have its photosensitive area illuminated by said light level variations, said phototransistor having an emitter, a collector, and a base, means connecting a load and a source of transistor energizing current in series between the emitter and collector of said phototransistor, means connected between the base and collector of said phototransistor for alternately short circuiting and open circuiting said electrodes at said carrier frequency, a pair of output terminals, circuit means connecting said collector to the first of said terminals, a capacitor connecting said emitter to the other of said terminals, and means connected between said terminals to periodically clamp the output of said circuit to zero at a frequency substantially higher than said carrier frequency.

12. Apparatus as specified in claim 11 wherein the means connected between said output terminals comprises a transistor operated as a synchronous switch.

13. A circuit for modulating a carrier frequency signal in accordance with light level variations comprising in combination a phototransistor having an emitter, a collector, and a base, means for illuminating the base-collector junction of said transistor with said light level variations, a source of transistor energizing current, a load, means connecting said source and said load in series between the emitter and collector of said transistor, and switching means connected between the base and collector of said transistor for alternately open circuiting and short circuiting said two electrodes at said carrier frequency.

14. An apparatus for modulating a carrier frequency signal in accordance with light level variations comprising in combination a phototransistor having a pair of output electrodes and a control electrode, means for illuminating the junction of said control electrode and one of said output electrodes with said light level variations, means connecting a source of transistor energizing current and a load in series between said output electrodes, and switching means connected between said input electrode and one of said output electrodes for alternately open circuiting and short circuiting said electrodes at said carrier frequency.

15. A circuit for modulating a carrier frequency signal in accordance with light level variations comprising in combination, a phototransistor having an emitter, a collector, and a base, means for illuminating the base-collector junction of said phototransistor with said light level variations, means connecting a source of energizing current and a load resistor in series between the emitter and the collector of said phototransistor, a transistor having an emitter, a collector, and a base, means connecting the emitter of said transistor to the base of said phototransistor, means connecting the collector of said transistor to the collector of said phototransistor, a pair of terminals adapted to be connected to a source of carrier frequency switching voltage, means connecting the base of said transistor to one of said terminals, means connecting the collector of said transistor to the other of said terminals, means connecting a diode in the reverse direction between the base and collector of said transistor, a pair of output terminals, means connecting the collector of said phototransistor to one of said output terminals, and a capacitor connecting the emitter of said phototransistor to the other of said output terminals.

16. A circuit for modulating the amplitude of a carrier frequency signal in accordance with the intensity of light incident upon the photosensitive area of a phototransistor comprising in combination a phototransistor having an emitter, a collector, and a base, a load and a source of transistor energizing current connected in series between the emitter and collector of said phototransistor, switching means connected between the base and collector of said phototransistor for alternately open circuiting and short circuiting said two electrodes at said carrier frequency, a pair of output terminals, means connecting the collector of said phototransistor to the first of said terminals, a capacitor connecting the emitter of said phototransistor to the second of said terminals, a transistor having an emitter, a collector, and a base, means connecting the collector of said transistor to the first of said terminals, means connecting the emitter of said transistor to the second of said terminals, a source of transistor switching voltage having a frequency substantially higher than said carrier frequency, and means connecting the emitter base circuit of said transistor to said source of switching voltage.

17. An apparatus for modulating a carrier frequency signal in accordance with light level variations comprising in combination a phototransistor having an emitter electrode, a collector electrode, and a base electrode, a source of energizing current and a load connected in series between said emitter electrode and said collector electrode, first switching means connected between said base electrode and one of said other electrodes for alternately open circuiting and short circuiting said electrodes at the carrier frequency, means for illuminating the junction of said last named electrodes with said light level variations, and second switching means, synchronized with said first switching means, connected to said load to periodically vary the value of said load.

18. An apparatus for modulating a carrier frequency signal in accordance with light level variations comprising in combination a phototransistor having an emitter, a collector, and a base, first switching means connected between the collector and base of said transistor to periodically open circuit an short circuit said electrodes at said carrier frequency, a source of energizing current and a load connected between the emitter and the collector of said phototransistor, and second switching means, synchronized with said first switching means, connected to said load to vary the value of said load.

19. Apparatus as specified in claim 18 wherein said second switching means is a transistor connected as a synchronous switch across part of said load.

20. An apparatus for modulating an electric signal in accordance with light level variations comprising in combination, a phototransistor having an emitter, a collector, and a base, first switching means connected between the collector and base of said transistor to periodically open circuit and short circuit said electrodes, a source of energizing current and a load comprising two parts connected between the emitter and collector of said phototransistor, and second switching means, synchronized with said first switching means, connected across one part of said load to periodically open circuit and short circuit said part of said load.

21. An apparatus for modulating a carrier frequency signal in accordance with light level variations comprising in combination a phototransistor having an emitter electrode, a collector electrode, and a base electrode, first switching means connected between said base elctrode and one of the other electrodes of said phototransistor to periodically open circuit and short circuit said two electrodes at the carrier frequency, a source of energizing current and two resistors connected in series between the emitter electrode and collector electrode of said phototransistor, and second switching means connected across one of the said two load resistors and synchronized with said first switching means to periodically short circuit said one load resistor when said first switching means is short circuiting said base electrode and said other electrode of said phototransistor.

22. An apparatus for modulating a carrier frequency signal in accordance with light level variations comprising in combination a phototransistor having an emitter, a collector, and a base, first switching means connected between the collector and base of said transistor to periodically open circuit and short circuit said two electrodes at said carrier frequency, a source of energizing current and two resistors connected in series between the emitter and collector of said phototransistor, and second switching means connected across the first of said two load resistors and synchronized with said first switching means to short circuit said first load resistor when said first switching means is short circuiting the base and collector electrodes of said phototransistor.

23. An apparatus for modulating the carrier frequency signal in accordance with light level variations comprising in combination a phototransistor having an emitter, a collector, and a base, first switching means connected between the collector and base of said transistor to periodically open circuit and short circuit said two electrodes at said carrier frequency, means connecting a first resistor, $R_L$, a second resistor, $R_x$, and a source of phototransistor energizing current in series between the emitter and collector of the phototransistor, and second switching means connected across said second resistor and synchronized with said first switching means to short circuit said second resistor when said first switching means is short circuiting the base-collector circuit of said phototransistor, the value of said second resistor being substantially:

$$R_x = \alpha_i R_L \left( \frac{1-\alpha_n}{1-\alpha_i} \right)$$

where $\alpha_i$=inverse D.C. current gain of said phototransistor,
$\alpha_n$=normal phototransistor D.C. current gain.

24. Apparatus as specified in claim 23 wherein said second switching means comprises a transistor having an emitter, a collector, and a base, the emitter-collector circuit of said transistor being connected in shunt across said second resistor, the base-collector circuit of said transistor being adapted to be connected to a source of carrier frequency switching voltage.

25. An apparatus for modulating the carrier frequency signal in accordance with light level variations comprising in combination a phototransistor having an emitter, a collector, and a base, means for illuminating the photosensitive area of said transistor with said light level variations, first switching means connected between the collector and base of said transistor to periodically open circuit and short circuit said two electrodes at said carrier frequency, a source of energizing current and a first load resistor, $R_L$, connected in series between the emitter and collector of said phototransistor, and second switching means connected in series with a second load resistor, $R_x$, across said first load resistor, said second switching means being synchronized with said first switching means to periodically shunt said second load resistor across said first load resistor when said first switching means is short circuiting the base-collector circuit of said phototransistor, the value of said second load resistor being substantially:

$$R_x = \frac{R_L}{\alpha_i} \left( \frac{1-\alpha_i}{1-\alpha_n} \right)$$

where $\alpha_i$=inverse D.C. current gain of said phototransistor,
$\alpha_n$=normal phototransistor D.C. current gain.

26. Apparatus as specified in claim 25 wherein said second switching means comprises a transistor having an emitter, a collector, and a base, the emitter-collector circuit of said transistor being connected in series with said second resistor across said load resistor, the base-collector circuit of said second transistor being adapted to be connected to a source of carrier frequency switching voltage.

References Cited in the file of this patent

UNITED STATES PATENTS

| | | |
|---|---|---|
| 2,570,978 | Pfann | Oct. 9, 1951 |
| 2,730,567 | McConnell | Jan. 10, 1956 |
| 2,794,863 | Van Roosbroeck | June 4, 1957 |
| 2,812,445 | Anderson | Nov. 5, 1957 |
| 2,823,322 | Trousdale | Feb. 11, 1958 |
| 2,862,109 | Kruper | Nov. 25, 1958 |

OTHER REFERENCES

Electronics, April 1954, page 171.